Nov. 30, 1937.  E. H. STIVENDER  2,100,364
CONTROL SYSTEM
Filed Feb. 14, 1936    7 Sheets-Sheet 5

Inventor
E. H. Stivender
by
Attorney

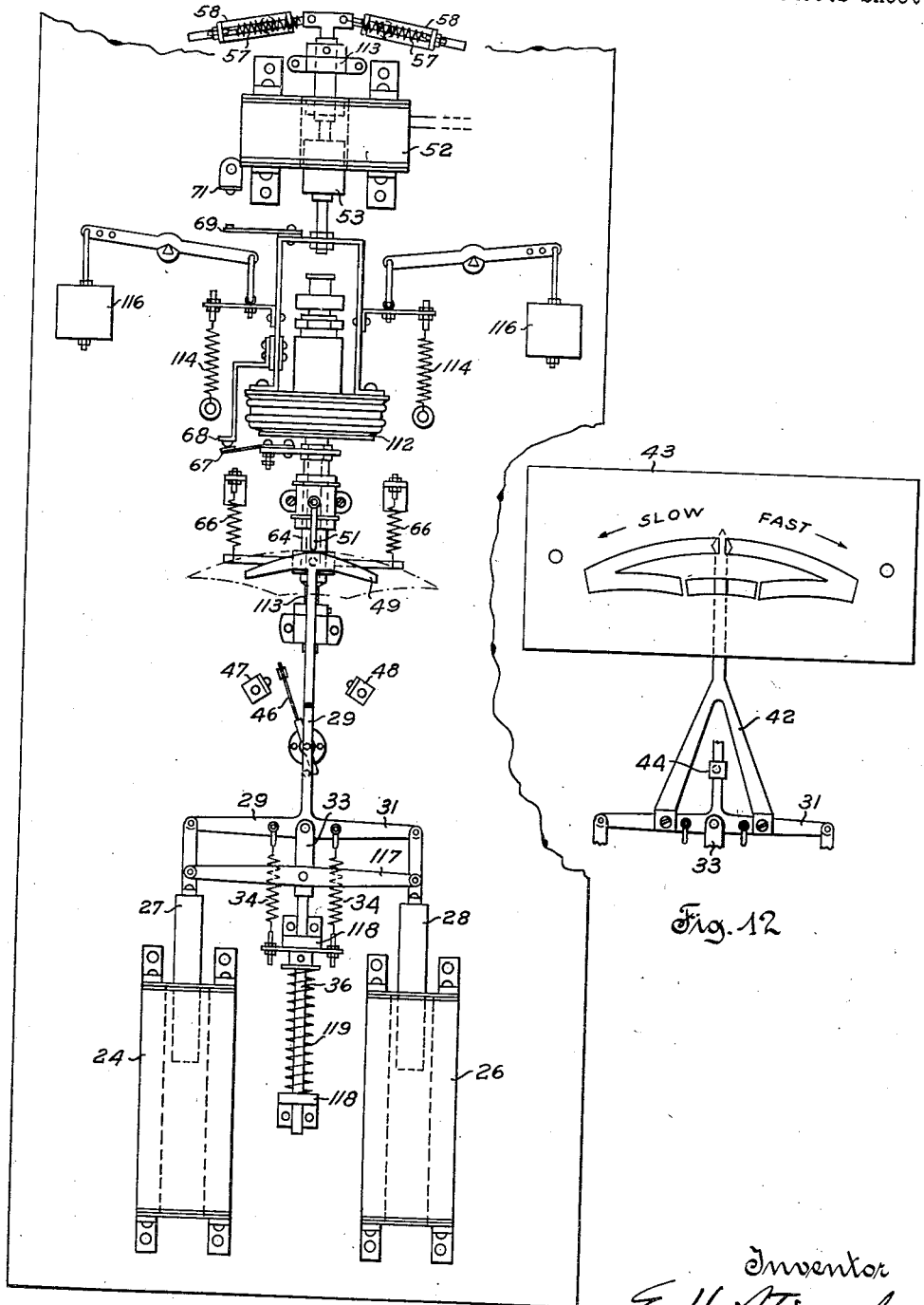

Patented Nov. 30, 1937

2,100,364

UNITED STATES PATENT OFFICE 2,100,364

CONTROL SYSTEM

Edward H. Stivender, West Allis, Wis., assignor to Allis-Chalmers Manufacturing Company, Milwaukee, Wis., a corporation of Delaware Application February 14, 1936, Serial No. 63,923

14 Claims. (Cl. 171—118)

This invention relates in general to improvements in control systems, and more particularly to a system including a device having the three functions of indicating the frequency and phase relations of two alternating current circuits, of controlling such relation, and of initiating the interconnection of the circuits as soon as such frequency and phase relations are properly adjusted.

When two independent alternating current circuits are to be connected with each other, it is generally necessary to regulate the frequency and phase of one of the circuits with respect to the other circuit, and to initiate the closure of a switch provided for connecting the circuits at a time in advance of phase coincidence of the voltages of the circuits by a constant time interval, such time interval being the time required to complete the operation of the switch to thus obtain physical connection of the circuits exactly at phase coincidence of the voltages thereof. When such functions are performed manually, it is necessary to obtain a visual indication of the phase angle between the voltages of the two circuits and between the frequencies of such voltages, and even if the circuits are to be automatically controlled, it is generally desired to obtain such visual indication. It is conceivable that all three functions could be performed by means of a system including a so-called synchroscope of the rotating field type provided with suitable control contacts and associated with suitable control circuits. The torque of such synchroscopes is however usually too low to permit actuation of contacts thereby, and a synchroscope having a sufficient torque would require an amount of current greater than is desirable to obtain from the instrument transformers usually utilized for connecting such instruments to the power circuits.

Such disadvantages may be obviated by utilizing a device actuated through solenoids, which are able to exert relatively large efforts on the armatures thereof and require comparatively little current. Such solenoids are preferably connected to receive different resultant voltages from the two power circuits to be connected, some of the solenoids actuating a member at a speed substantially proportional to the rate of change of the phase angle between the voltages of the two circuits. Such member is then utilized both for controlling the frequency of one of the circuits and for engaging a contact moved transversely in the path thereof to initiate the closure of the switch joining the two power circuits, the member then also giving a visual indication of the relative phases and frequencies of the two circuits.

It is therefore one object of the present invention to provide a control system including a unitary device for indicating and controlling the frequency and phase relation between the voltages of two alternating current circuits and for controlling the interconnection of such circuits.

Another object of the present invention is to provide a control system for controlling an alternating current circuit with respect to another such circuit which requires a relatively small amount of current for the operation thereof.

Another object of the present invention is to provide a control system including a device in which a single member controls the frequency of an alternating current circuit and initiates the connection thereof with another alternating current circuit.

Another object of the present invention is to provide a control system including a device actuated by a plurality of solenoids receiving different resultant voltages from two alternating current circuits to be connected with each other.

Another object of the present invention is to provide a control system including a device responsive to the beat frequency of two alternating current circuits for producing control impulses of constant duration for adjusting the frequency of one of the circuits.

Objects and advantages other than those above set forth will be apparent from a consideration of the following description when read in connection with the accompanying drawings, in which:

Fig. 1 diagrammatically illustrates the apparatus and the connections of one embodiment of a system according to the present invention utilized for controlling the relative frequency and phase and the interconnection of two alternating current circuits and utilizing a single device for indicating and controlling such frequency and phase relation and for controlling the instant of such interconnection;

Figure 2:
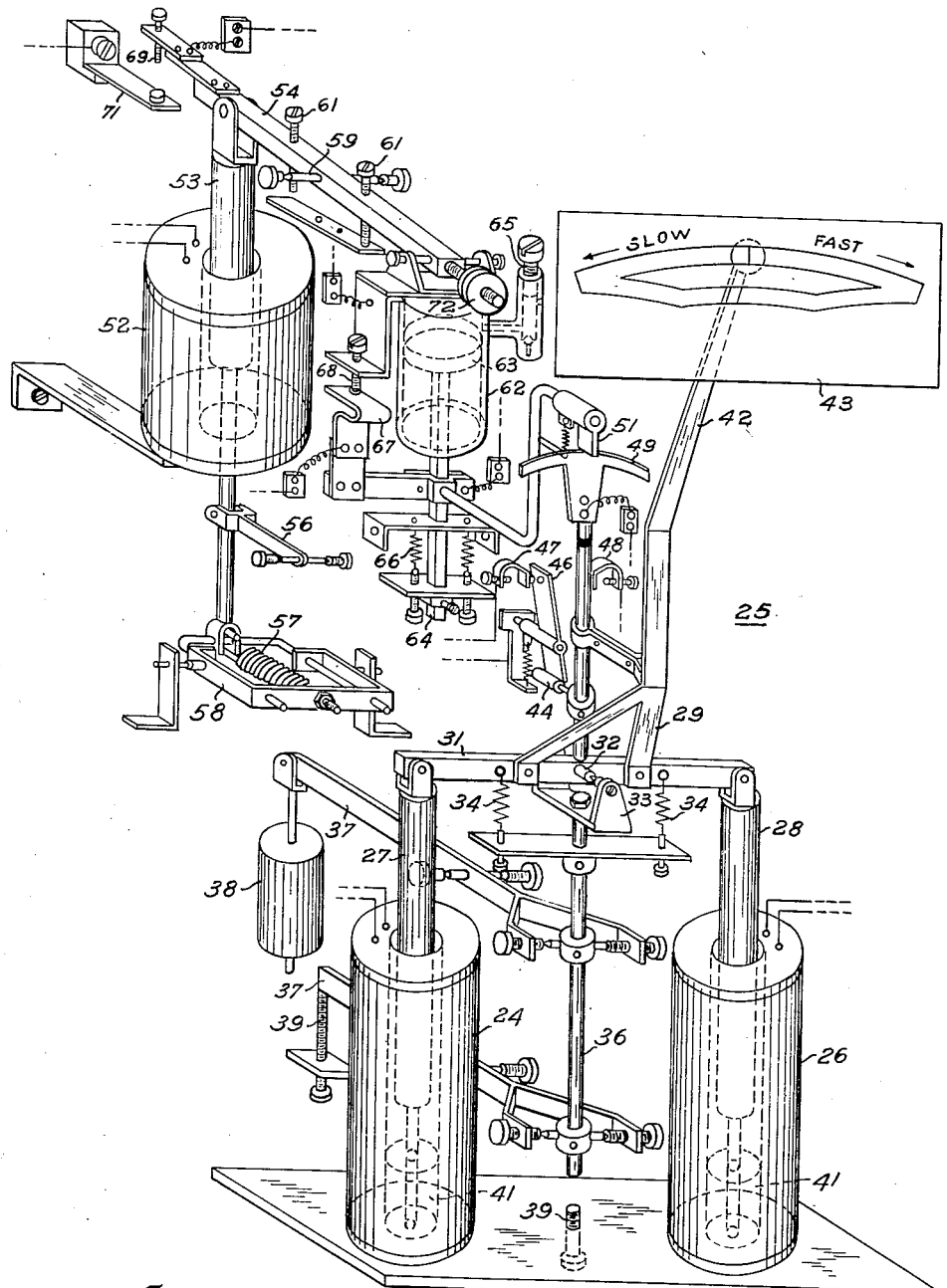
Fig. 2 is an approximate perspective view of one embodiment of the main control device utilized in the system illustrated in Fig. 1.
Figures 13, 14:
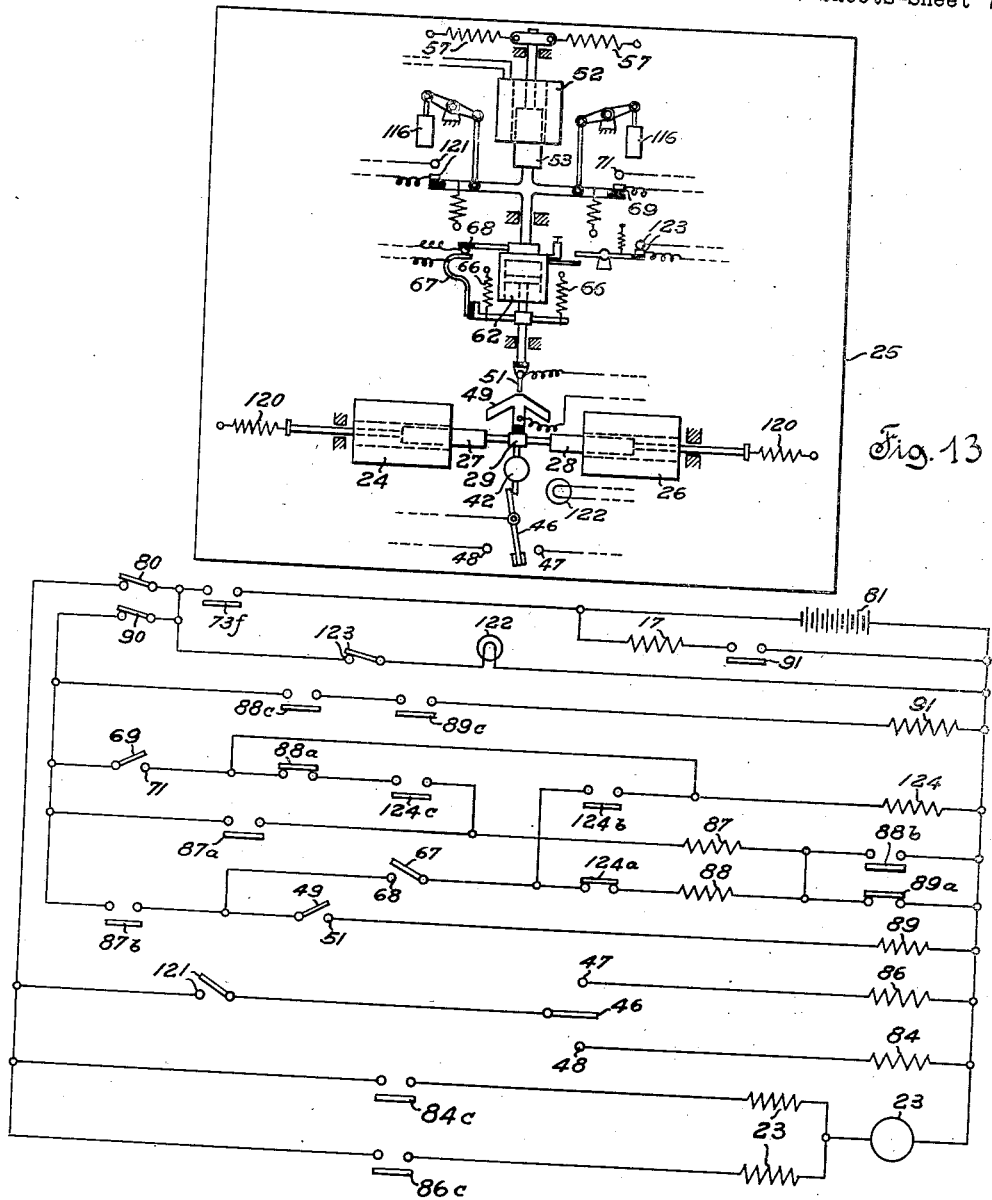

Figs. 5 to 10 inclusive, are diagrams illustrating modified forms of the solenoid connections of the main control device;

Fig. 11 is a view in front elevation of a modified embodiment of the device illustrated in Fig. 2, omitting the pointer and dial thereof to clarify the drawings;

Fig. 12 is a view in front elevation of the pointer and dial of the embodiment illustrated in Fig. 11;

Fig. 13 diagrammatically illustrates another modified embodiment of the main control device; and Fig. 14 is a diagram of a modified embodiment of the connections (except the solenoid connections) of the system when utilizing the embodiment of the main control device illustrated in Fig. 13.

It will be understood that elements illustrated in any one of the figures of the drawings may also be utilized in connection with elements illustrated in other figures thereof to form further embodiments of the present invention.

Elements performing the same function in the different embodiments herein illustrated are designated by the same reference numerals in the different figures, although the configuration and arrangement of such elements may be different in the different embodiment shown.

Figure 1:
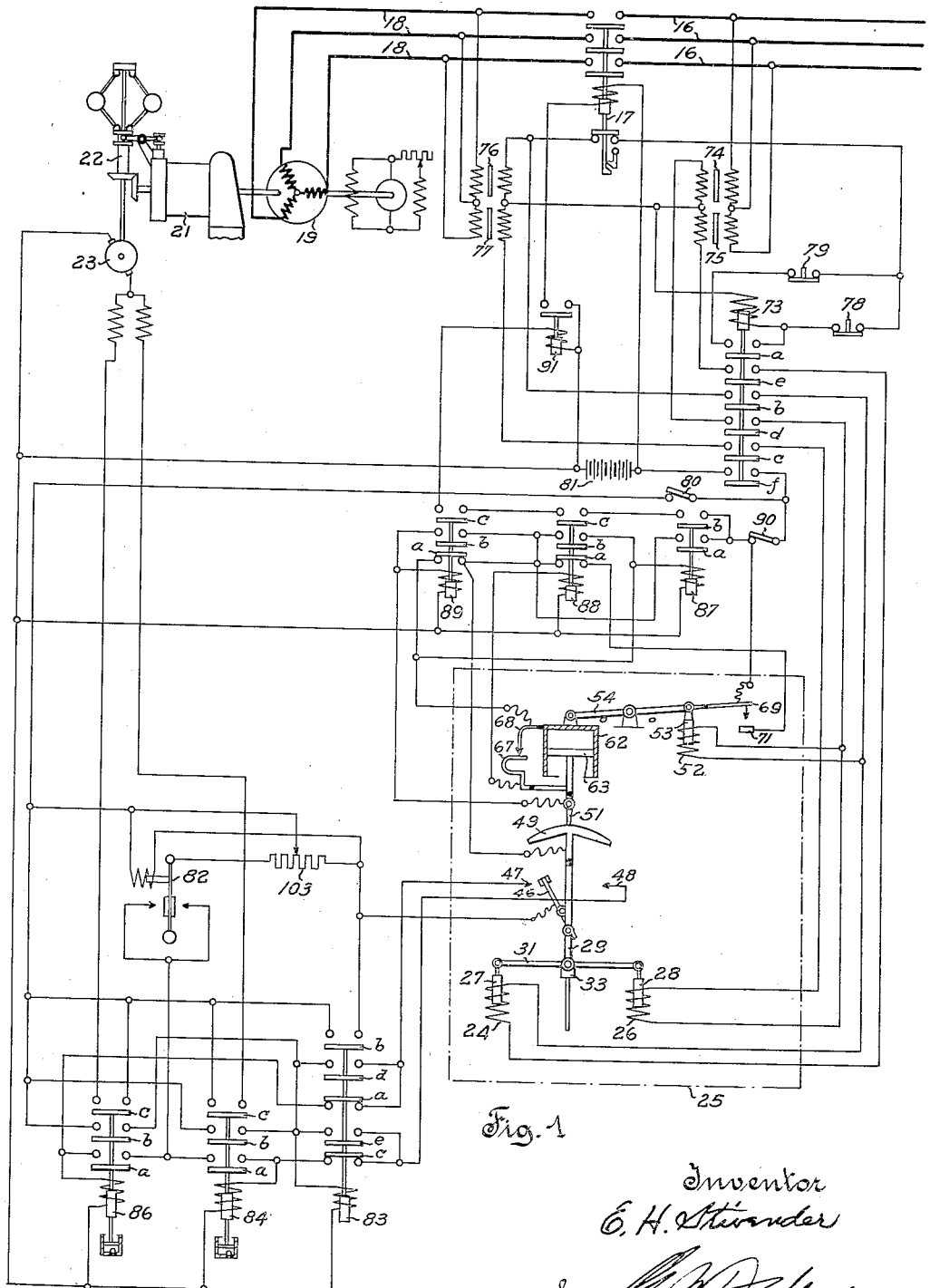

Referring more particularly to Fig. 1 of the drawings by characters of reference, reference numeral 16 designates an alternating current circuit herein illustrated as a three-phase circuit. Circuit 16 is assumed to be energized from a suitable source (not shown), the magnitude, frequency and phase of the voltage thereof being taken as reference values for such quantities throughout the present description. Circuit 16 is adapted to be connected by means of a switch 17 with a second alternating current circuit 18 independent of circuit 16. Circuit 18 is assumed to be energized from a generator 19 driven by a suitable prime mover such as a steam turbine 21 having a speed governor 22. The governor maintains the speed of turbine 21 at a constant value which may be adjusted, as is well known, by displacing an element of the governor by means of a reversible electric motor 23 provided with an armature and with two oppositely acting field windings.

The essential device 25 of the present control system, shown in preferred form and at rest in Fig. 2, comprises a framework, not shown herein to render the drawings clearer, supporting a pair of solenoids 24, 26 which may be disposed in different manners on the framework but are preferably arranged in side by side relation with the axes thereof vertical and parallel. The solenoids are provided with associated cores or armatures 27, 28 which constitute the actuating means for a unitary control member 29 serving to control the frequency and phase relations of the voltages of circuits 16 and 18, to indicate such relations, and to control the operation of switch 17. Member 29 may be constituted of a single piece of metal, but is preferably made up of different portions or elements severally adapted to perform their respective functions. More particularly, member 29 may comprise a lever portion 31 from which armatures 27 and 28 are suspended for longitudinal movement thereof in the associated solenoids, the solenoids being so dimensioned as to also permit the slight lateral movement imparted to the armatures by lever 31. The lever is provided with a pivot 32 whereby it is supported on a movable bracket 33 permitting rocking movement of lever 31 about the pivot under the differential action of armatures 27, 28 thereon. Such movement is restrained in either direction of rotation from a rest position, which is the position shown, by means of a pair of springs 34 acting between the lever and bracket 33 or any other element rigidly connected to the bracket.

The bracket is supported on a rod 36 and is guided therewith in a path substantially parallel to the axes of solenoids 24 and 26 by means of a pair of parallel pivoted levers 37 on which rod 36 is pivotally mounted. The movement of the motive system including armatures 27 and 28, lever 31, bracket 33 and rod 36, about the pivots of levers 37 is restrained by suitable means such as an adjustable counterweight 38 suspended from one of levers 37. Such movement is also limited by a pair of suitable adjustable stops 39. The movement of the armatures within the solenoids may be further guided, if desired, by providing the armatures with extensions engaging plugs 41 inserted within the solenoids and also serving as stops to limit the movement of the armatures. The motive system thus constituted is preferably so adjusted that the pull exerted by each solenoid on the associated armature is a uniform function of the current in the solenoid for all positions of the armature.

Member 29 comprises a pointer portion 42 co-operating with a dial 43 for indicating the phase and frequency relation of power circuits 16 and 18. The member also comprises a cam portion 44, which may be in the form of a roller cooperating with a pivoted contact 46 to cause engagement of such contact with a fixed contact 47 or with another fixed contact 48, to control the operation of motor 23 for regulating the frequency of the voltage of generator 19. Member 29 further comprises a contact portion 49 preferably insulated from the remainder of the member and having an edge adapted for engaging a cooperating contact member 51 for controlling the connection of the power circuits. Such edge is shaped in accordance with intersecting portions of two symmetrical right hand and left hand spirals of Archimedes having their common centers on the axis of pivot 32.

Contact 51 is actuated by a second motive system comprising a third solenoid 52 having an armature or core 53. Such armature is supported and guided within solenoid 52 for longitudinal movement therethrough by means of a second pivoted lever 54 which may be supplemented by another pivoted lever 56, the system being preferably so adjusted that the pull exerted by the solenoid on its armature is a uniform function of the current in the solenoid for all positions of the armature. The movement of armature 53 is continuously restrained by suitable yielding means such as a spring 57 acting in a variable direction, different from the direction of guided movement of armature 53, between an extension of armature 53 and a fixed point. The action of spring 57 is thus caused to change at a rate varying continuously in function of the travel of armature 53 in a predetermined non-uniform manner. The attachment of spring 57 at the fixed point is obtained through a pivoted frame 58, whereby the two effective points of attachment of the spring may be chosen distant by less than the free length of the spring. The spring also exerts a side thrust on armature 53, which may be neutralized by utilizing a pair of cooperating springs instead of a single spring.

Lever 54 is provided with a pivot 59 supported at a fixed point and permitting oscillatory movement of the lever within limits determined by means of adjustable stops 61. Lever 54 supports a hollow cylinder 62 pivotally suspended therefrom and constituting a dashpot having a piston 63 mounted on a piston rod 64. Air may be admitted freely into the dashpot by a ball check valve and may be expelled therefrom under the restriction of a port adjustable in size by means of a screw 65. Piston rod 64 is guided in its movement by suitable means and is urged upwards by means of springs 66 attached at a fixed point. The piston rod supports contact 51 and also supports another contact 67 cooperating with a contact 68 supported by dashpot 62. Lever 54 carries a contact 69 cooperating with a fixed contact 71. It will be understood that suitable insulation is provided for insulating the different contacts from each other and from the frame of the device. Lever 54 may be variably biased toward the position shown by means of a movable counterweight 72.

Figure 3:
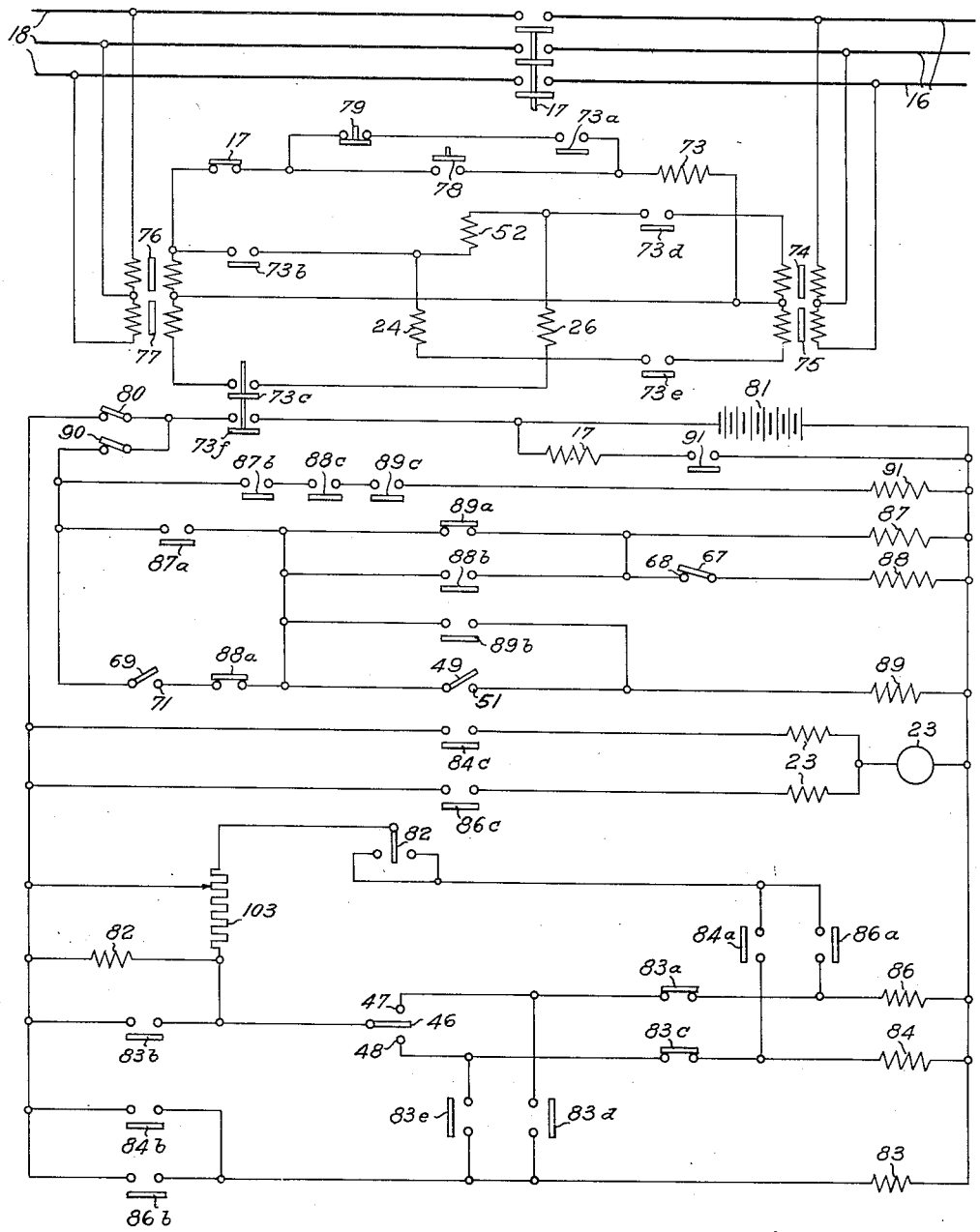
Fig. 3 is a simplified diagram of the connections of the system represented in Fig. 1 and utilizing the embodiment of the main control device illustrated in Fig. 2.

As shown in Fig. 1 and in Fig. 3, solenoids 24, 26 and 52 may be connected with the power circuits through contacts 73b, 73c, 73d and 73e of an auxiliary relay 73 and through potential transformers 74, 75, 76 and 77. Transformers 74 and 75 are connected in V across the conductors of circuit 16, and transformers 76 and 77 are similarly connected across the corresponding conductors of circuit 18. The secondary windings of all four transformers each have a terminal connected to a common point. Solenoid 24 is connected across the free secondary terminals of transformers 75 and 76, solenoid 26 is connected across the free secondary terminals of transformer 74 and 77, and solenoid 52 is connected across the free secondary terminals of transformers 74 and 76, the solenoids thus receiving different resultant voltages from the power circuits.

The coil of relay 73 is connected with transformer 76 through a push button switch 78 and through auxiliary contacts of switch 17, so that the relay may be operated only when generator 19 is energized and switch 17 is open. The relay 73 is provided with a holding circuit through its contact 73a, which circuit may be interrupted by means of a second push button switch 79. Relay 73 controls the connection of a suitable control source, such as a battery 81, with the circuits associated with the main control device 25. More particularly, the battery may be connected with the coil of an oscillating relay 82 through contact 73f, a knife switch 80, the coil of relay 82, contact 46, and from such contact 46 either through contact 47, and contact 83d of a relay 83, or through contact 48 and another contact 83e of relay 83 to the coil of relay 83 and back to the battery. Relays 82 and 83 and the associated circuits control a pair of time delay relays 84, 86 each operable to connect the associated one of the field windings and the armature of motor 23 with battery 81. Contacts 49, 51, 67, 68, 69 and 71 control the connection of battery 81 with the coils of a first relay 87, a second relay 88, and a third relay 89 which relays are operable only in the numerical sequence thereof to connect the battery with the coil of a relay 91 to cause energization of the closing coil or equivalent actuating mechanism of switch 17. Relays 84, 86, 87, 88 and 89 are accordingly provided with contacts each designated by the reference numeral of the relay considered followed by an identifying letter.

The operation of the system will be considered assuming the voltage of circuit 16 to be constant in magnitude and in frequency, and assuming generator 19 to be running and having the voltage thereof adjusted at substantially the same value as the voltage of circuit 16, but of slightly lower frequency. Upon closure of push button 78 to initiate the operation of the system, the coil of relay 73 receives current from transformer 76 through the auxiliary contacts of switch 17, and the relay closes the contacts thereof, thus connecting the solenoids of control device 25 with the two power circuits. The relay holds itself closed by means of its holding contacts 73a, which maintain the coil thereof connected with transformer 76. Under the assumed conditions, the voltage of circuit 18 sequentially lags behind the voltage of circuit 16, reaches phase coincidence therewith, leads such voltage to reach phase opposition therewith, and thereafter again lags behind the voltage of circuit 16, such cycle of variation recurring with a frequency which is the so-called beat frequency and which is equal to the difference of the frequencies of the voltages of the power circuits. During such beat cycle, the resultant voltages of the power circuits applied to the solenoids of control device 25 vary in the manner illustrated in Fig. 4, in which curves 92, 93, and 94 represent the R. M. S. values of the voltages impressed on solenoids 24, 52 and 26 respectively in function of the momentary phase difference between the voltages of the power circuits taken as abscissas. As will be readily understood by those skilled in the art, such curves are sinusoidal curves having a period equal to twice the period of the beat cycle, but the negative portions of such curves are herein shown reversed for the reason that the R. M. S. values represented thereby are all positive quantities. The voltages represented by curves 92 and 94 differ in phase by an angle of 120° of beat frequency, but it will be understood that the circuits may also be so adjusted that such voltages differ by other angles smaller than 180° of beat frequency.

The solenoids and the armatures thereof are so designed that the armatures do not reach magnetic saturation when the voltages represented by curves 92, 93 and 94 are severally impressed on the solenoids. The efforts exerted by the solenoids on their armatures are then proportional to the square of the solenoid voltages and such efforts are represented by curves 96, 97 and 98 respectively, which are sinusoidal curves displaced with respect to the axis thereof by an amount equal to the peak value thereof and having a frequency equal to the beat frequency. The downward pull jointly exerted by armatures 27 and 28 on lever 31 to lift counterweight 38 is equal to the sum of the pulls severally exerted by the two armatures, and is represented by a sinusoidal curve 99. The torque exerted by the armatures on lever 31 against the action of springs 34 is proportional to the difference of the pulls of the individual armatures, and is represented by a sine curve 101.

When generator 19 is started from rest and the field winding thereof is energized, the voltage impressed by the generator on circuit 18 has a variable frequency which is, at first, very different from that of the voltage of circuit 16, the beat frequency therebetween is high and the solenoids tend to impart a rapid reciprocating movement to their armatures. The inertia of the armatures and of the associated members is such that the solenoids maintain the armatures thereof immovable in the attracted position thereof when the beat frequency exceeds a predetermined value such as four cycles per second for example. When the beat frequency decreases to a value less than four cycles per second, the frequency of the voltage of circuit 18 (or more briefly stated, the frequency of circuit 18) being lower than the frequency of circuit 16, armatures 27 and 28 begin to impart to member 29 a combined dipping and oscillating movement.

Figure 4:
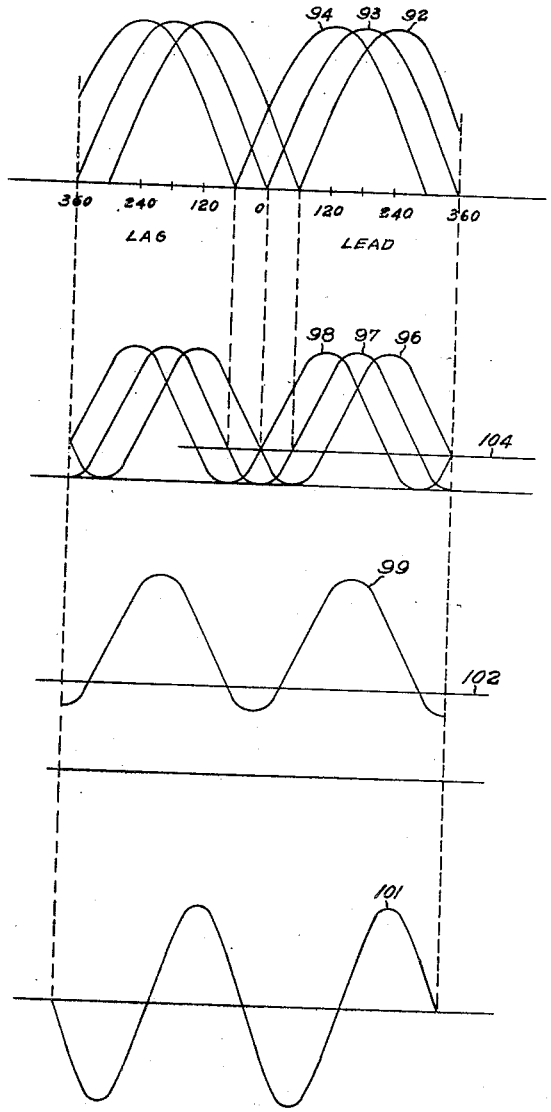
Fig. 4 is a diagram of the voltages impressed on the solenoids utilized in the different embodiments of the main control device and of the resultant efforts exerted by the solenoids on their armatures.
Figure 5:
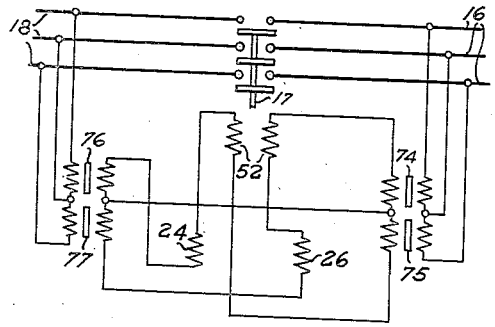

Considering the two power circuits to be momentarily in phase coincidence and departing therefrom to return to phase concidence after one cycle of beat frequency, the joint downward pull of solenoids 27 and 28 is at first minimum and less than the value, represented by line 102 in Fig. 4, necessary for causing downward movement of the member against the action of counterweight 38. The torque impressed on member 29 is then zero, and the member lies momentarily in the position shown. The voltage of circuit 18 then gradually lags from phase coincidence to substantially 30 degrees behind the voltage of circuit 16, and the torque exerted on member 29 gradually increases from zero to one-half the maximum value thereof, the magnitude of the torque increasing substantially proportionally to the angle of lag of the voltage of circuit 18.

The movement of member 29 being restrained by springs 34, the member assumes a different position for every value of the phase angle between the voltages of the power circuits. Neglecting the effect of inertia and friction, the momentary driving torque applied to member 29 by armatures 27, 28, which is substantially proportional to the angle of lag of the voltage of circuit 18, is equal at every instant to the resisting torque exerted thereagainst by springs 34, which resisting torque is substantally proportional to the angular displacement of member 29. Such angular displacement is thus substantially proportional at every instant to the phase angle between the voltages of the power circuits, of which the value is accordingly indicated, in sign and in magnitude, by pointer 42 on the upper portion of dial 43. As a result thereof, member 29 is displaced at a speed substantially proportional to the rate of variation of the phase angle between the voltages of the power circuits and, more particularly, the member 29 is caused to rotate at a substantially uniform speed about pivot 32, without displacing bracket 33, when the phase angle between the voltages of the power circuits varies at a uniform rate within a predetermined range of phase angles therebetween.

The movement of member 29 about pivot 32 continues when the phase angle of the voltage of circuit 18 increases from 30 degrees lagging to substantially 50 degrees lagging, such movement however then departing from the above stated law of proportionality, and being terminated by abutment of armature 27 on the associated stop 41. Member 29 then remains stationary until the combined action of solenoids 24 and 26 overcomes the action of counterweight 38. Solenoid 26 and armature 28 then cooperate to gradually move member 29 about the connection thereof with armature 27, whereby bracket 33 is urged downward until engagement of rod 36 with one of stops 39. Bracket 33 thereafter remains stationary, and member 29 is tilted about pivot 32 to thereby assume a position differing from the vertical by an angle substantially proportional to the departure of the voltages of the power circuits from phase opposition, and the phase angle between such voltages is then indicated by pointer 42 on the lower portion of dial 42. Such movement continues until engagement of armature 28 with the associated stop 41. The downward pull of solenoids 24 and 26 thereafter decreases and permits counterweight 38 to raise bracket 33 while member 29 rotates about the connection thereof with armature 28. Bracket 33 thus returns to the position shown, and member 29 thereafter is returned to the position shown by spring 34, such movement being effected at a rate proportional to the rate of change of the phase angle between the voltages of the power circuits within the range of 30 degrees leading to phase coincidence.

Such sequence of operation is repeated during each cycle of the beat voltage of the power circuits, the target portion of pointer 42 each time making a complete circuit behind the slot of dial 43. Such circuit is made in the direction marked "slow" under the present assumptions. During such movement, member 29 cooperates with other elements of the device in controlling circuit 18 with respect to circuit 16 in two different manners, i. e. by regulating the frequency of circuit 18 with respect to that of circuit 16 and by controlling the connection of circuit 18 with circuit 16.

The first named function is accomplished by a system including cam element 44 cooperating with contact 46. Under the present assumptions, every time the voltages of the power circuits are approaching phase coincidence, cam 44 engages contact 46 and when circuit 18 begins to lag the cam causes engagement of contact 46 with contact 48 upon movement of member 29 in the predetermined direction thereof into a predetermined position. A circuit is thereby momentarily completed from battery 81 through contact 73f, switch 80, the coil of relay 82, contacts 46 and 48, contacts 83c, and the coil of relay 84 back to the battery. Relay 84 accordingly attracts the armature thereof, connects the coil thereof with the contacts of relay 82 through contact 84a, and also completes a circuit from battery 81 through contact 73f, switch 80, contact 84b, and the coil of relay 83 back to the battery. Relay 82 attracts the armature thereof and closes one of the associated contacts, which connects the coil of relay 84 with battery 81, independently of contacts 46 and 48, through contact 73f, switch 80, a portion of an adjusting resistor 103, one of the contacts of relay 82, contact 84a, and the coil of relay 84 back to the battery. Relay 83 also attracts the armature thereof, thus disconnecting contact 47 from the coil of relay 86 to prevent premature operation of relay 86 in the event of engagement of contacts 46 and 47, disconnecting the coil of relay 84 from contact 48, and bridging the coil of relay 82 through contact 83b. Relay 82 thereupon releases the armature thereof, which oscillates and alternately engages the two associated contacts, such oscillatory movement being thus initiated in response to the operation of relay 84 and continuing thereafter for a predetermined length of time determined by the adjustment of relay 82.

Every time the armature of relay 82 engages one of the associated contacts, the coil of relay 84 receives a current impulse from battery 81.

Relay 84 is provided with time delay means operable to delay the release of the armature thereof for a length of time greater than the interval between current impulses applied thereto through the contacts of relay 82, so that relay 84 remains in operating position for a predetermined length of time extending as long as relay 82 intermittently closes the contacts thereof. Relay 84 then completes a circuit from battery 81 through contact 73f, switch 80, contact 84c, one of the field windings and the armature of motor 23 back to the battery for regulating the frequency of circuit 18, such circuit being established during a predetermined length of time equal to the time of contact making operation of relay 82 plus the time required for opening relay 84. Any continued operation of relay 84 beyond the desired length of time, which could occur if member 29 remained continuously in the position engaging contacts 46 and 48 or passed repeatedly through such position at frequent intervals, is avoided by the disconnection of contact 48 from the coil of relay 84 by contact 83c. Motor 23 thus adjusts the regulating element of governor 22 to a predetermined extent independent of the initial magnitude of the departure of the frequency of circuit 18 from that of circuit 16.

Governor 22 is given a correcting impulse in such manner once for every beat of the voltages of circuits 16 and 18, except when such impulses would overlap as set forth above, and thus receives a total corrective adjustment which is directly proportional to the departure of the frequency of generator 19 from the desired value. When such frequency approaches the value of the frequency of circuit 16, the operation of the main control device 25 becomes slower, and the correcting impulses, while decreasing in number, remain of uniform length so that an excessive correction of the governor action is usually avoided. If however an excessive correction is produced, or if switch 78 was closed when the frequency of generator 19 was already higher than that of circuit 16, device 25 operates to reverse the movement of member 29, whereby contact 46 is caused to intermittently engage contact 47 and thus initiate the operation of relay 86 in a manner similar to that above described with respect to relay 84. Relay 86 then intermittently connects the second field winding and the armature of motor 23 with battery 81 to apply corrective impulses to governor 22 to decrease the speed of turbine 21 and thus decrease the frequency of generator 19.

The second controlling function of member 29 on circuit 18 results from the action of contact 49 thereof in cooperation with contact 51. Movement of contact 51 occurs in response to the action of solenoid 52 on armature 53. When the beat frequency of the power circuits is less than approximately four cycles per second, armature 53 will follow the impulses imparted thereto by solenoid 52 against the action of spring 57. Counterweight 72 is so adjusted that solenoid 52 must exert at least an effort represented by line 104 in Fig. 4 for attracting armature 53, so that the armature remains attracted during the major portion of the beat cycle. The armature is released by decrease of the pull of solenoid 52 approximately 60 degrees before phase coincidence of the power circuits, to reach the position shown upon such phase coincidence and return to the attracted position when the phase angle between the power circuits again reaches approximately 60 degrees. Such armature movement is continuously restrained by spring 57 or other equivalent yielding means having an action changing at a rate which varies continuously in function of the travel of the armature, to cause such armature movement to occur at a speed proportional to the rate of variation of the phase angle between the voltages of the power circuits within a predetermined range of phase angles therebetween. Thus such armature movement occurs at a substantially uniform speed when the phase angle varies at the uniform rate within such range and the distance between the momentary position of armature 53 and the position shown is proportional at every instant to the phase angle between the voltages of the power circuits.

Bearing in mind that, neglecting the effect of inertia and friction, during such movement the upward effort exerted by spring 57 on armature 53 is equal at every instant to the momentary downward pull of solenoid 52 thereon, the variation of the action of spring 57 in function of the phase angle between the voltages of the power circuits follows the same law as the variation of the pull exerted on armature 53 in function of such phase angle, and is represented by curve 97 in Fig. 3. If, then, the law of variation of the action of spring 57 in function of the travel of armature 53 is such that it may also be represented by curve 97, the travel of armature 53 will always be proportional to the phase angle between the voltages of the power circuits, and the desired movement thereof will be obtained. It may be determined mathematically that the law of variation of the downward pull of spring 57 in function of the travel of armature 53 is expressed by a function which, although not identical with the function represented by curve 97, closely approximates such function within the range of phase angles herein utilized when the dimensions and arrangements of spring 57 are suitably selected. Such approximation is particularly close if spring 57 becomes unstressed and assumes the free length thereof when the axes of the spring and of armature 53 become perpendicular, and is otherwise always under tension.

When the power circuits approach phase coincidence, assuming the phase angle between the voltages thereof to vary at a uniform rate, armature 53 is accordingly moved upward by spring 57 at a substantially uniform speed and dashpot 62 is thereby moved downward at a substantially uniform speed. Dashpot 62 thus compresses the air contained therein, which escapes through the port thereof at a rate such that the pressure built up within the dashpot is substantially proportional to the speed thereof. Such pressure is exerted on piston 63, which is thereby urged downward against the action of springs 66. The piston is thereby displaced to an extent such that the tension of spring 66, which is proportional to the elongation thereof, becomes equal to the pressure exerted on the piston. The displacement of piston 63 is thus rendered proportional to the pressure within dashpot 62 and to the speed of armature 53, so that contact 51 carried by the dashpot is caused to move transversely to the path of contact 49 and to assume a position in such path dependent upon the speed of armature 53 and, therefore, upon the rate of change of the phase angle between the voltages of the power circuits. After piston 63 assumes a stationary position, dashpot 62 continues to move downward to ultimately engage contact 68 carried thereby with contact 67 carried by the piston.

It will be observed that, when the phase angle between the voltages of the power circuits varies at a uniform rate toward phase coincidence, number 29 rotates at a uniform speed about pivot 32 and, inasmuch as the leading edge of contact 49 is of spiral shape, such edge rises towards contact 51 at a uniform speed proportional to the rate of change of the phase angle and, at phase coincidence of the power circuits, tends to reach the edge of contact 51, which is then in the rest position shown in Fig. 2. The vertical distance between the edge of contact 49 and the rest position of contact 51 is thus proportional to the phase angle between the power circuits within limits determined by the width of contact 49 and, at a time preceding phase coincidence by any predetermined time interval which may be selected at any desired value consistent with such limits, such distance has a value proportional to the rate of change of such phase angle. But during the operation of the device, contact 51 is caused to assume a position distant from the rest position thereof by an amount also proportional to the rate of change of the phase angle, which results in engagement of contacts 49 and 51 at a time preceding phase coincidence by a predetermined constant time interval regardless of the rate of variation of the phase angle between the voltages of the power circuits. Such time interval may be regulated by means of screw 65 and is adjusted to a value equal to the time required by relay 89, relay 91 and switch 17 to operate to connect circuits 16 and 18 in the manner set forth hereinafter. It will be evident that the above result would also be obtained if contacts 49 and 51 were replaced by other equivalent control members so shaped as to cause mutual engagement thereof at the desired instant.

Every time that armature 53 reaches the attracted position thereof, contacts 69 and 71 are engaged and complete a circuit from battery 81 through contact 73f, knife switch 90, contacts 69 and 71, contact 88a, contact 89a, and the coil of relay 87 back to the battery. Relay 87 thereupon operates and bridges contacts 69, 71 and 88a by means of contact 87a, thus maintaining itself energized while armature 53 returns toward the position shown. If the beat frequency of the power circuits is greater than a predetermined value, such as one cycle in six seconds for example, armature 53 returns toward the position shown at a speed such that contact 49 engages contact 51 before an appreciable amount of air has been expelled from dashpot 62 and, therefore, before any possible engagement of contacts 67 and 68. A circuit is thus completed from battery 81 through contact 73f, knife switch 90, contact 87a, contacts 49 and 51 and the coil of relay 89 back to the battery. Relay 89, thus being energized, operates contact 89a to open the circuit of the coil of relay 87. Relay 87 then releases the armature thereof and opens the circuit of the coil of relay 89 through contact 87a. Subsequent closure of contacts 67 and 68, if such closure occurs at all, is then without effect. Such sequence of operation is repeated for every cycle of the beat frequency.

When the beat frequency of the power circuits is less than one cycle in six seconds, the power circuits may be connected by means of switch 17. Relay 87 is continually caused to operate as above described each time armature 53 is in the attracted position thereof. When the armature returns towards the position shown however, the air within dashpot 62 is given sufficient time to escape and thereby permits piston 62 to assume a position such that contacts 67 and 68 engage before contacts 49 and 51 and while the coil of relay 87 is energized. Upon such engagement, a circuit is completed from battery 81 through contact 73f, switch 90, contact 87a, contact 89a, contacts 68 and 67 and the coil of relay 88 back to the battery. Relay 88 operates and bridges the contacts o. relay 87, so that relay 88 may remain energized even if relay 89 becomes energized. Contacts 49 and 51 thereafter engage at a predetermined time interval ahead of phase coincidence of circuits 16 and 18, thus completing a circuit from batery 81 through contact 73f, switch 90, contact 87a, contacts 49 and 51 and the coil of relay 89 back to the battery. Relay 89 closes contact 89b bridging contacts 49 and 51, thus maintaining itself energized even when contacts 49 and 51 become disengaged. Relays 87, 88 and 89 then being all three energized, such relays complete a circuit from battery 81 through contact 73f, switch 90, contacts 87b, 88c, 89c, and the coil of relay 91 back to the battery. Relay 91 thereupon operates to connect the coil of switch 17 with battery 81 to cause the switch to close. By proper adjustment of screw 65, contacts 49 and 51 are caused to engage at a time ahead of phase coincidence of the power circuits by a constant interval such that closure of the main contacts of switch 17 is completed at the exact time of phase coincidence of the power circuits. Switch 17 latches itself in, and opens the circuit of the coil of relay 73, which returns to the position shown. All the other relays are thus also caused to return to the position shown. At such time, device 25 is also in the position shown and thereafter remains in such position. As it is not desirable that contact 49 then remain in constant engagement with contact 51, the tip of contact 49 is preferably removed to prevent such engagement.

Although the above description assumes that the frequency of generator 19 is lower than the frequency of circuit 16, the operation of the system for connecting the circuits when the frequency of generator 19 is higher than that of circuit 16 would be entirely similar to the above described. The movement of member 29 is then however reversed so that the trailing edge of pointer 49 becomes the leading edge thereof and engages with contact 51. In either case switch 17 is closed at the first favorable opportunity.

The contacts of device 25 and of relays 81, 88, 89 constitute interlocks for preventing operation of the relays when the relays are energized in a sequence different from the numerical sequence thereof, the control circuit for switch 17 including contacts of the three relays and completing such control circuit only when all three relays have operated in the proper sequence. If such sequence is not observed, or if either of the relays fails to be energized or otherwise fails to operate, switch 17 will not be closed, so that accidental untimely closure of the switch is precluded.

The above description of the operation of the control device neglects the effect of friction and of inertia of the elements thereof on their movement for the reason that the efforts obtained by means of the solenoids permit use of restraining means having an effect compared to which the effects of friction and inertia are inconsiderable. The effect of friction between the elements of the device needs not even be reduced to the greatest possible extent, so that metallic bearings can be utilized for the pivots instead of the more expensive jewel bearings. The effect of the engagement and disengagement of the different contacts of the device upon the movement thereof is likewise immaterial.

The solenoid connection illustrated in Fig. 3 is preferred because it distributes the supply of current to the three solenoids between four potential transformers. In the modification of such connection shown in a simplified manner in Fig. 5, solenoid 52 is illustrated as consisting of two coils severally connected in series with solenoids 24 and 26, the two coils cooperating to exert, on armature 53, the efforts represented by curve 97 in Fig. 3.

Figure 8:
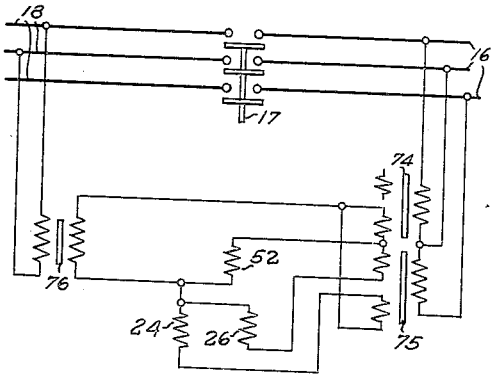
Figure 6:
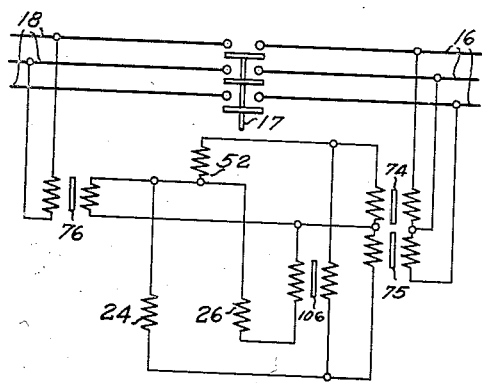
Figure 9:
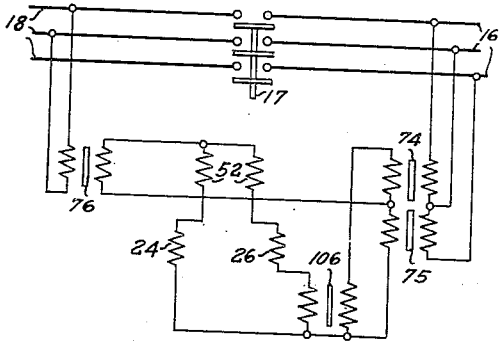
Figure 7:
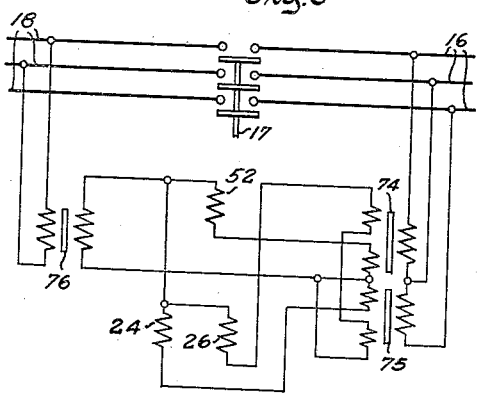
Figure 10:
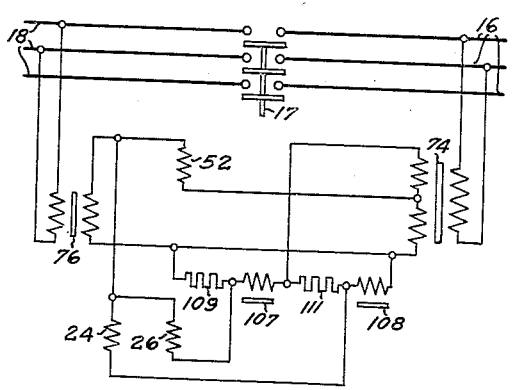

One of the potential transformers may be omitted by utilizing one of the connections illustrated in Figs. 6, 7, 8, and 9. In Figs. 6 and 9, solenoid 26 receives a voltage which is the resultant of the voltages of transformer 76 and of a transformer 106 connected across the secondary terminals of transformers 74 and 75. Such transformer 106 may be omitted if transformers 74 and 75 are each provided with two secondary windings as shown in Figs. 7 and 8. As shown in Fig. 10, transformer 75 may also be omitted, solenoids 24 and 26 then receiving energy from transformer 74 through a pair of reactors 107, 108 and a pair of resistors 109, 111 to obtain impression of the proper voltages thereon.

In the embodiment of the control device 25 illustrated in Figs. 11 and 12, a bellows 112 is shown in place of dashpot 62 for performing exactly the same function. The bellows is directly supported from armature 53, lever 54 is accordingly omitted and armature 53, bellows 112 and contact 51 carried thereby are guided for vertical sliding movement by means of suitable guides 113. The lateral thrust of spring 57 on armature 53 is neutralized by the provision of a second cooperating spring. Such springs may also cooperate with a pair of springs 114 acting in the direction of movement of armature 53 if desired. The weight of the armature is preferably balanced by means of adjustable counterweights 116. The movement of armatures 27 and 28 is guided by the provision of a lever 117 forming a parallelogram with lever 31 and the two armatures. Bracket 33 and its supporting rod 36 are guided for vertical sliding movement in guides 118, such movement being restrained by means of a spring 119.

The operation of the present embodiment of the control device is identical with that of the embodiment illustrated in Fig. 2 in all its essential particulars. As a result of the substitution of spring 119 for counterweight 38 however, the combined dipping and rocking movement of member 29 is slightly different in the two embodiments, but the exact nature of such movement is immaterial as it occurs outside the range of possible engagement of contacts 49 and 51.

In the embodiment diagrammatically illustrated in Fig. 13 contact 51 is actuated in the same manner as in the embodiment illustrated in Figs. 11 and 12. Solenoids 24 and 26 are arranged in alinement about a common horizontal axis to impart to member 29 a horizontal reciprocatory movement, and the joint effort of the solenoids on member 29 may again be represented by curve 101 in Fig. 4. The rectilinear movement of member 29 is restrained by means of a pair of springs 120, and such movement is substantially uniform when the phase angle between the voltages of the power circuits varies uniformly within a predetermined range including phase coincidence. Contact 49 must therefore have the operative edges thereof made rectilinear instead of spiral in shape. The present embodiment of device 25 is provided with additional contacts, to be described hereinafter, not utilized in the embodiments illustrated in Figs. 2, 11 and 12, and is thus particularly adapted to function when connected with the associated relays as shown in Fig. 14. Such connections utilize all the devices represented in Fig. 1 except relays 82, 83 and resistor 103, which are omitted to simplify the drawings, so that motor 23 is then controlled by only two relays 84 and 86. Such relays are again selectively energized from battery 81 through contact 46 and through contact 47 or 48. Member 29 moving back and forth in the same path whether the frequency of circuit 18 be higher or lower than the frequency of circuit 16, contact 46 alternately engages contacts 47 and 48 in either case, but the connection of the battery with contact 46 is then effected through a pair of contacts 121 controlled by armature 53. In this manner, assuming the frequency of circuit 18 to be lower than that of circuit 16, contacts 121 are closed by armature 53 when the power circuits are approximately in phase opposition and cam 44 carried by member 29 then causes contact 46 to engage contact 48, thus causing operation of relay 84. When the power circuits are approximately in phase coincidence, contacts 121 are open, and when member 29 causes contact 46 to engage contact 47 during the return movement of member 29, relay 86 is not energized thereby. In a similar manner, contacts 121 prevent relay 84 from operating when the frequency of circuit 18 is higher than that of circuit 16.

Pointer 42 is reduced to the target portion thereof, which moves back and forth in a rectilinear path, the movement thereof thus giving no indication of the relative frequencies of the power circuits. To obtain such indication, pointer 42 is caused to be illuminated by a lamp 122 energized from battery 81 through a pair of contacts 123 controlled by armature 53. In such manner, lamp 122 is illuminated only when the power circuits are approximately in phase coincidence, and member 29 gives the same indication of the phase and frequency relations between the power circuit as are given by pointer 42 when bracket 33 is in the upper position thereof in the previously described embodiments. The control of relay 91 is effected through relays 87, 88 and 89 which are now associated with an additional relay 124 having for purpose to check the operation of dashpot 62.

When armature 53 is in the attracted position, contacts 69 and 71 are engaged, completing a circuit from battery 81 through contact 73f, switch 90, contacts 69, 71 and the coil of relay 124 back to the battery. Relay 124 operates to complete another circuit from battery 81 through contact 73f, switch 90, contacts 69 and 71, contact 88a, contact 124c, the coil of relay 87, and contact 89a back to the battery. Relay 87 thereupon operates, and contact 87a thereof bridges the serially connected contacts 69, 71, 88a and 124c so as to maintain the coil of relay 87 energized when contacts 69 and 71 open. Contact 87b of relay 87 also connects contacts 49 and 68 with battery 81. Armature 53 thereafter is released by solenoid 52, thus opening contacts 69 and 71. Relay 87 then remains energized, but relay 124 is deenergized and returns toward the position shown, which is reached thereby after a predetermined time delay. If contact 51 engages contact 49 before engagement of contacts 67 and 68, a circuit is completed thereby from battery 81 through contact 73f, switch 90, contacts 87b, 49 and 51 and the coil of relay 89 back to the battery. Relay 89 then operates, thus opening the circuit of the coil of relay 87 by means of contact 89a. Relay 87 returns to the position shown and causes opening of the circuit of the coil of relay 89, which also returns to the position shown as in the embodiment illustrated in Fig. 1. If contacts 67 and 68 engage first, a circuit is completed from battery 81 through contact 73f, switch 90, contacts 87b, 68, 67 and 124a, the coil of relay 88, and contact 89a back to the battery, provided that relay 124 has already reached the position shown. Upon subsequent closure of contacts 49 and 51, the coil of relay 89 is energized as in the embodiment illustrated in Fig. 3. Relays 88 and 89 having operated, coil 91 is thereby connected with battery 81 to cause closure of switch 17. If however dashpot 62 fails to operate properly, so that contacts 67 and 68 remain permanently engaged or engage before relay 124 has had time to return from the energized position to the position shown, such engagement would cause untimely closure of switch 17. Such disadvantage is obviated for the reason that as soon as relay 87 has operated and contacts 67 and 68 are engaged, a circuit is completed from battery 81 through contact 73f, switch 90, contacts 87b, 68, 67 and 124b and the coil of relay 124 back to the battery, whereby relay 124 is retained in the energized position and maintains open the circuit of the coil of relay 88. Relay 88 may thus not operate and thus precludes closure of switch 17. If failure of dashpot 62 prevents any engagement of contacts 67 and 68, relay 88 will again fail to operate and switch 17 will again not close.

Although but a few embodiments of the present invention have been illustrated and described it will be apparent to those skilled in the art that various changes and modifications may be made therein without departing from the spirit of the invention or from the scope of the appended claims.

It is claimed and desired to secure by Letters Patent:

1. A device of the character described comprising a pair of solenoids, a pair of armatures for said solenoids, a lever member supporting said armatures and having a pivot, a movable bracket supporting said member through said pivot, means for guiding said bracket, means for restraining the movement of said member about said pivot, and means for restraining the movement of said bracket.

2. In combination, two alternating current circuits, means for controlling one of said circuits with respect to the other circuit comprising a control member having a pivot, actuating means for said member including a pair of differentially acting solenoids each energized from both said circuits and severally receiving different resultant voltages from said circuits, a movable bracket supporting said member through said pivot, means for guiding said bracket, means for restraining the movement of said member about said pivot, and means for restraining the movement of said bracket.

3. A device for controlling the relation between two alternating current circuits comprising a motive system including a pair of side by side solenoids having parallel axes each energized from both said circuits and severally receiving different resultant voltages from said circuits, a control member having a pivot and arranged to be actuated by said solenoids, a movable bracket supporting said member through said pivot, means for guiding said bracket, means for restraining the movement of said member about said pivot, means for restraining the movement of said bracket, and a control system for controlling the connection of said circuits including an element of said member.

4. A device for controlling the relation between two alternating current circuits comprising a motive system including a pair of side by side solenoids having parallel axes each energized from both said circuits and severally receiving different resultant voltages from said circuits, a control member having a pivot and arranged for actuation by said solenoids, a movable bracket supporting said member through said pivot, means for guiding said bracket, means for restraining the movement of said member about said pivot, means for restraining the movement of said bracket, and a control system for controlling the connection of said circuits and another control system for regulating the frequency of one of said circuits, said systems severally including elements of said member.

5. A device for controlling the relation between two alternating current circuits comprising a motive system including a pair of side by side solenoids having parallel axes each energized from both said circuits and severally receiving different resultant voltages from said circuits, a control member operable by said solenoids and having a pivot, a movable bracket supporting said member through said pivot, means for guiding said bracket, means for restraining the movement of said member about said pivot, means for restraining the movement of said bracket, and a control system for regulating the frequency of one of said circuits including an element of said member.

6. The combination with two alternating current circuits of a device for controlling the connection of said circuits having a motive system including a solenoid energized from said circuits to receive a resultant voltage therefrom, an armature for said solenoid, means for supporting and guiding said armature within said solenoid for longitudinal movement therethrough, and yielding means continuously restraining the movement of said armature and having an action changing at a rate which varies continuously in function of the travel of said armature to cause said movement to occur at a substantially uniform speed when the phase angle between the voltages of said circuits varies at a uniform rate within a predetermined range of phase angle therebetween.

7. The combination with two alternating current circuits of a device for controlling the connection of said circuits having a motive system including a solenoid energized from said circuits to receive a resultant voltage therefrom, an armature for said solenoid, means for supporting and guiding said armature within said solenoid for longitudinal movement therethrough, and means for causing the movement of said armature to occur at a substantially uniform speed when the phase angle between the voltages of said circuits varies at a uniform rate within a predetermined range of a phase angle therebetween comprising a spring continuously acting on said armature in a variable direction different from the direction of guided movement of said armature.

8. In combination, two alternating current circuits, means for controlling one of said circuits with respect to the other circuit comprising a control member, actuating means for said member including a solenoid energized from said circuits to receive a resultant voltage therefrom, an armature for said solenoid, means for supporting and guiding said armature within said solenoid for longitudinal movement therethrough, yielding means continuously restraining the movement of said armature and having an action changing at a rate varying continuously in function of the travel of said armature to cause said movement to occur at a speed proportional to the rate of variation of the phase angle between the voltages of said circuits within a predetermined range of phase angles therebetween, a dashpot connecting said member with said armature, and means for restraining the movement of said member to cause said member to assume a position dependent upon the speed of said armature.

9. A device for controlling the relation between two alternating current circuits comprising a motive system including two side by side solenoids having parallel axes, a pair of armatures for said solenoids, a lever member supporting said armatures and having a pivot, a movable bracket supporting said member through said pivot, means for guiding said bracket, means for restraining the movement of said member about said pivot, means for restraining the movement of said bracket, and means for connecting said solenoids to the circuits for causing said member to rotate at a substantially uniform speed about said pivot without displacing said bracket when the phase angle between the voltages of the circuits varies at a uniform rate within a predetermined range of phase angles therebetween.

10. A device for controlling the relation between two alternating current circuits comprising a motive system including two side by side solenoids having parallel axes, a pair of armatures for said solenoids, a lever member supporting said armatures and having a pivot, a movable bracket supporting said member through said pivot, means for guiding said bracket, means for restraining the movement of said member about said pivot, means for restraining the movement of said bracket, means for connecting said solenoids to the circuits for causing said lever to assume a different position for every value of the phase angle between the voltages of the circuits within a predetermined range of phase angles therebetween, and means for visually indicating said phase angle.

11. A device for controlling the connection of two alternating current circuits including a control member, means connected with the circuits for causing said control member to be displaced at a speed substantially proportional to the rate of variation of the phase angle between the voltages of the circuits, a second control member, and means connected with the circuits for causing the second said control member to move transversely to and assume a position in the path of the first said member depending on the said rate of variation of the phase angle between the voltages of the circuits.

12. A device for controlling the connection of two alternating current circuits including a control member, means connected with the circuits for causing said control member to be displaced at a speed substantially proportional to the rate of variation of the phase angle between the voltages of the circuits, a second control member, and means connected with the circuits for causing the second said control member to move transversely to and assume a position in the path of the first said member depending on the said rate of variation of the phase angle between the voltages of the circuits, the first and second said control members being so shaped as to cause mutual engagement thereof at a moment leading the moment of phase coincidence of the voltages of the circuits by a substantially constant time interval.

13. A device for controlling the connection of two alternating current circuits including a control member, means connected with the circuits for causing said control member to be displaced at a speed substantially proportional to the rate of variation of the phase angle between the voltages of the circuits, a second control member, and means connected with the circuits including a lever and a dashpot actuated by said lever having a piston supporting said second control member for causing the said second control member to move transversely to and assume a position in the path of the first said control member depending on the said rate of variation of the phase angle between the voltages of the circuits, a first relay energized through contacts actuated by said lever, a second relay energized through contacts on said dashpot and on said piston, a third relay energized by engagement of said control members, interlocks between said relays for preventing operation thereof when said relays are sequentially energized in a sequence different from the numerical sequence thereof, a switch for connecting said circuits, and a control circuit for said switch including contacts actuated by said relays and completing said control circuit when all three relays have operated.

14. A device for controlling an alternating current circuit with respect to another alternating current circuit comprising a pair of side by side solenoids having parallel axes each energized from both said circuits and severally receiving different resultant voltages from said circuits, a lever arranged to be actuated by said solenoids and having a pivot, a movable bracket supporting said member through said pivot, means for guiding said bracket, means for restraining the movement of said member about said pivot, and means for restraining the movement of said bracket, a control member on said lever, a relay operable in response to movement of said member in a predetermined direction into a predetermined position, means responsive to operation of said relay to maintain said relay in operating position for a predetermined length of time, means for preventing continued operation of said relay beyond said length of time when said member remains continuously in said position, and a control circuit including an element of said relay for regulating the frequency of one of said circuits.

EDWARD H. STIVENDER.